UNITED STATES PATENT OFFICE.

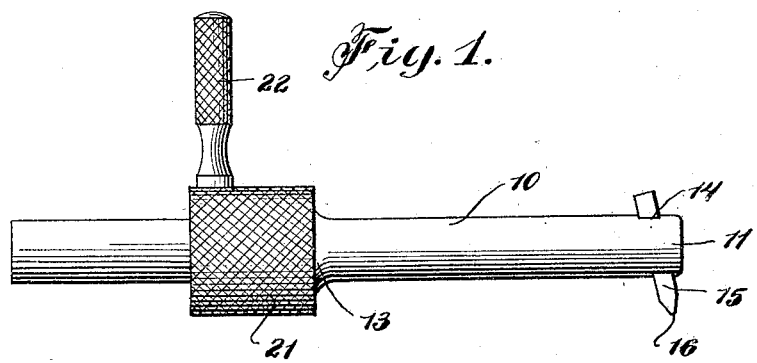
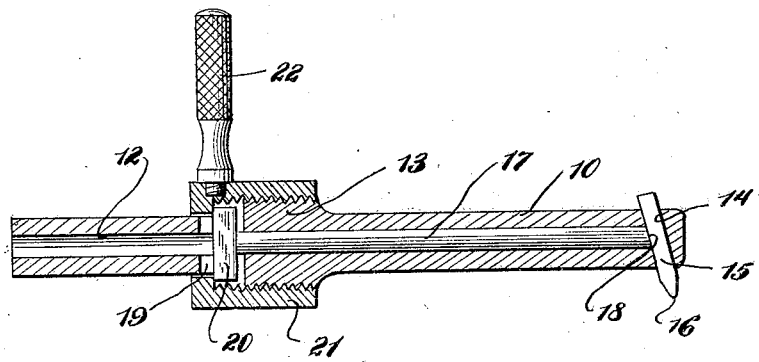

JAMES R. AULENBACK, OF BRIDGEWATER, NOVA SCOTIA, CANADA.

INSIDE-CUTTING TOOL.

1,377,109. Specification of Letters Patent. Patented May 3, 1921.

Application filed December 15, 1919. Serial No. 344,988.

*To all whom it may concern:*

Be it known that I, JAMES R. AULENBACK, residing at Bridgewater, in the Province of Nova Scotia and Dominion of Canada, have invented new and useful Improvements in Inside-Cutting Tools, of which the following is a specification.

This invention relates to tools, particularly to those of the cutting variety, and has for its object the provision of a tool which may be rotated for performing the functions of a reamer or which may be held stationary for cutting on inside lathe work or the like, the invention residing particularly in novel means for holding a cutter member upon its supporting shank.

An important object is the provision of a tool of this character in the nature of an elongated supporting shank having at its ends a transverse inclined opening within which is disposed a bar sharpened to provide a cutting edge, this bar being adjustable whereby to protrude to a greater or less extent beyond the shank, and means being provided for locking the bar immovable at any desired adjusted position without the use of set screws or similar holding means.

An additional object is the provision of a tool of this character which will be simple and inexpensive in manufacture, highly efficient in use, durable in service, and a general improvement in the art.

With the above and other objects and advantages in view, the invention consists in the deails of construction to be hereinafter more fully described and claimed, and illustrated in the accompanying drawings in which—

Figure 1 is a side elevation of the device, and

Fig. 2 is a longitudinal sectional view.

Referring more particularly to the drawing, the numeral 10 designates the shank of the device which is formed as a hollow cylindrical body having one end closed, as shown at 11, and having a cylindrical bore 12. Formed upon this shank intermediate the ends thereof, is an enlarged portion 13 which is externally threaded, as shown. The shank adjacent the closed end is provided with a transverse opening 14 which is inclined with respect to the longitudinal axis of the shank and disposable within this opening is a cutter bar 15 formed of a short length of steel, preferably rectangular in cross-section whereby to prevent angular displacement thereof and so shaped at one end as to provide a cutting edge or point 16.

In order that this bar 15 may be locked against movement within the opening 14, I provide a rod 17 disposed within the bore 12 and having one end inclined, as shown at 18, for engagement with the bar 15. Rearwardly of the enlarged portion 13, the shank 10 is provided with a transverse opening 19 at which the other end of the rod 17 terminates and disposed within this opening 19 is a pin 20 which is engageable with the rod 17 and which extends beyond the periphery of the shank 10 at opposite sides thereof.

Threaded onto the enlarged portion 13 is a sleeve 21 which has its external periphery milled or knurled, as shown, which is provided with a laterally extending handle 22, and which has a flange 23 engaging the pin 20.

In the operation of the tool the bar 15 is disposed within the opening 14 and so arranged that the cutting point 16 thereof will extend laterally beyond the shank 10 to the desired extent. The rod 17 is then inserted within the bore 12 with its inclined end engaging the bore 15 and the sleeve 21 is then threaded onto the enlarged portion 13. The flange 23 of the sleeve will engage the laterally projecting ends of the pin 20 and will force the pin against the rod 17 and cause the rod 17 to clampingly engage the member 15 for preventing movement of the latter. When the parts are so arranged and locked, it will be seen that the device may be used as a reamer by rotating the same or may be used as an inside cutter for lathe work.

From the foregoing description and a study of the drawings it will be apparent that I have thus provided an extremely simple and efficient device which is well adapted for the cutting of holes and which will be very easily and quickly adjustable for different purposes.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A device of the character described comprising a shank having a bore and provided at one end with a transverse opening, said shank being provided intermediate its ends with an enlarged portion externally threaded and also being provided rearwardly of said enlarged portion with a transverse opening, a cutter bar disposed within said first named opening and having a cutting point extending laterally beyond the shank, a rod disposed within said bore and having one end abutting against said cutter member and having its other end terminating at said second named opening, a transverse pin disposed through said second named opening, and a sleeve threaded upon said enlarged portion and having a flange abuttingly engaging said pin for forcing said rod into clamping engagement with said cutter bar.

In testimony whereof I affix my signature.

JAMES R. AULENBACK.